Figure 4:
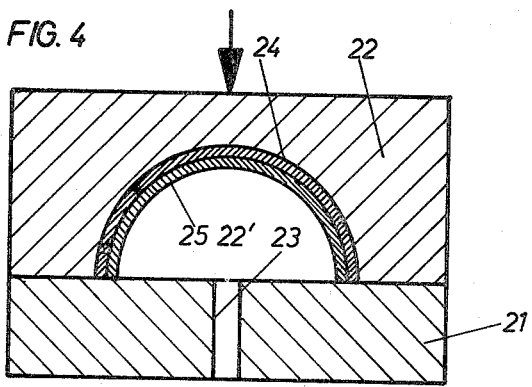

April 5, 1966  D. EISSFELDT ETAL  3,244,783
METHOD FOR MOLDING AND COATING MATERIALS
AND ARTICLES BY INTERNAL PRESSURE
Filed March 28, 1962  2 Sheets-Sheet 1
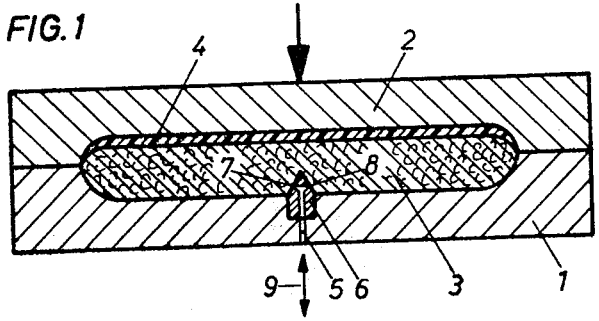
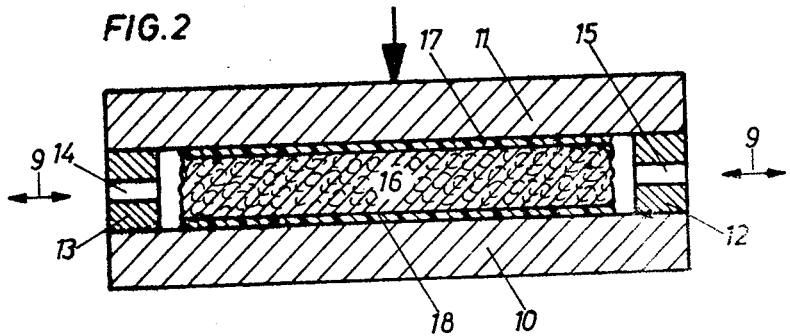
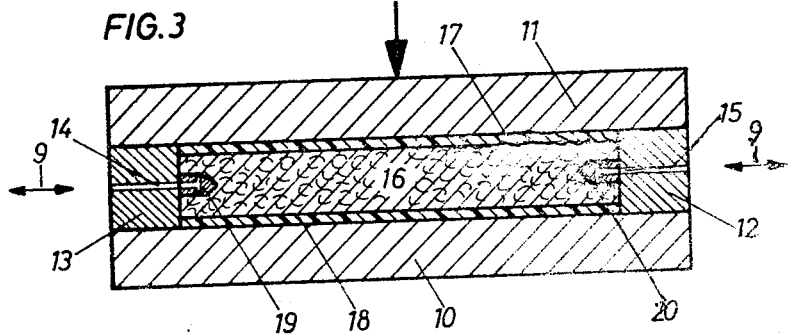
INVENTORS
Dieter Eissfeldt
Edmund Munk
Herbert Haas
ATTORNEYS
Dicke & Craig
ATTORNEYS April 5, 1966  D. EISSFELDT ETAL  3,244,783
METHOD FOR MOLDING AND COATING MATERIALS
AND ARTICLES BY INTERNAL PRESSURE
Filed March 28, 1962
2 Sheets-Sheet 2

INVENTORS
Dieter Eissfeldt
Edmund Munk
Herbert Haas
ATTORNEYS
Dicke & Craig
ATTORNEYS United States Patent Office 3,244,783
Patented Apr. 5, 1966

3,244,783
METHOD FOR MOLDING AND COATING MATE-
RIALS AND ARTICLES BY INTERNAL PRESSURE
Dieter Eissfeldt, Essen, Edmund Munk, Wurttemberg, and Herbert Haas, Urach, Wurttemberg, Germany, assignors to PAG Presswerk A.G., Essen, Germany, and Furnier- und Sperrholzwerk J. F. Werz jr. K.G. Werzalit-Pressholzwerk, Oberstenfeld, Wurttemberg, Germany
Filed Mar. 28, 1962, Ser. No. 183,243
Claims priority, application Germany, Mar. 30, 1961, P 26,862
7 Claims. (Cl. 264—112)

The present invention relates to a method for producing moldings of a material which essentially consists of a filler and a thermosetting binder. The fillers which may be employed according to the invention may, for example, consist of any of the known fillers of a fibrous, pulverulent, fine-granular, or chiplike consistency such as wood chips, shavings, or sawdust, or chopped textiles, paper, straw, or the like. The thermosetting binders to be employed are of the kind which either do not set or harden at all at a normal room temperature or only set so slowly that they may be kept in a loose condition for hours or even days so that the fillers which are mixed with such binders may be easily filled into a mold without setting. However, after this mixture is filled into the mold and is then heated therein, the binder becomes set within a very short time, for example, within a few minutes. The binders which at present are preferably applied to fillers of the above-mentioned kinds are, for example, melamine resin, phenol resin, and the like. The method according to the invention is applicable particularly to the molding of fillers which are mixed with only very small amounts of binders. Because of this saving in expensive resin binders, such materials which are also classified as non-flowing or non-ascending molding materials and which possess many properties superior to those of molding materials which are composed entirely or to a large extent of plastics are preferred for the production of many articles.

More particularly, the present invention relates to a method for producing moldings which are covered with a layer of plastic. Inasmuch as a molding which is made of a filler mixture of the type as mentioned above can usually be produced only with an unsightly surface and, especially when the filler is provided with only a small content of binder, with a surface which may be rather rough or porous, it is an object of the invention to cover such a molding with a layer of plastic so as to attain a smooth, uninterrupted nonporous surface which may in addition be made of any desired shade or color or provided with any surface design, vein, or grain effect. Such cover layers of plastic which are also called overlays or decorative sheeting consist, for example, of wood veneers which are impregnated with melamine, phenol, or other resins, of plastic-impregnated textile fabrics, or plastic-coated sheeting of various materials, or resin-coated paper which may be of a plain color or printed with a grain or other design.

In the production of moldings which are made from a filler mixture as above described and are provided with a cover layer of plastic, it is possible to produce outer surfaces of the highest quality, with a mirror finish and free of pores only if the surfaces of the mold are highly polished, if at least the outer-most layer and the covering have a sufficient content of plastic, and if the molding is produced in the mold under a very high pressure. This requires a relatively high specific weighed-in quantity of material, which means that a relatively large volume of material must be weighed in or measured and filled into the mold and thereafter be compressed to the volume of the final article.

The use of such a high specific weighed-in quantity means that the production of a molding of a certain volume requires a relatively large quantity of molding material which involves considerable costs. Furthermore, due to the large quantity of material which is compressed to form the desired article, this article also has a very high specific gravity. In order to manufacture moldings as light as possible, of the smallest possible quantity of molding material, under the lowest permissible compression, and as economically and inexpensively as possible, the specific weighed in quantity must be made as small as possible but still of a size so that molded part has a solidity in accordance with the particular requirements. Accordingly to the known methods of manufacture, however, it is either entirely impossible to attain high-quality closed outer surfaces or that it is only possible to attain surfaces which very frequently have so-called open parts or pores. These defective parts in the outer surfaces which are often clearly visible with the bare eye quickly pick up dirt when the respective molded product, for example, a table top, a seat, or the like, is in use, and the entire product therefore becomes unsightly very quickly. This often affects the use and sale, for example, of molded products with plain-colored decorative layers to such an extent that they have to be discarded in favor of moldings with surface designs which do not show as much the defective places which have changed in color by having picked up dirt. An even greater disadvantage of these prior methods is the high percentage of rejects occurring during the manufacture and the resulting uncertainty about the outcome.

It is an object of the present invention to provide a method for producing molded materials and articles which are made of a filling material of the type as previously described and are coated with a layer of plastic, and which new method overcomes the mentioned disadvantages of the known methods, avoids waste and rejects, and absolutely insures that the products attained have closed, nonporous outer surfaces. A further object of the invention is to attain these results even though the molding material has a very small content of thermosetting binder and only small weighed-in quantities of molding material, and even though low compression ratios are applied in order to produce moldings of a low specific gravity and as economically as possible.

According to the invention, this object is attained primarily by employing a cover layer of a plastic which has a gas permeability smaller than that of the molding material, and by producing at least during the setting period of the binder in the molding material and in the plastic of the cover layer such a gas pressure at the inside of the molded part that on the outer surfaces of the cover layer which engage upon the walls of the mold chamber a specific surface pressure is produced which at the prevailing temperature exceeds the vapor pressure of the volatile constituents of the cover layer and prevents the development thereof and thus also the development of any gas or vapor bubbles.

The effect of the inventive method may be explained as follows:

At the beginning of the molding process, that is, while the molding material increases in temperature, the mold is progressively closed, whereby the molding material is increasingly compressed until, when the mold is completely closed, the different parts of the mold are in engagement with each other and the molding material is compressed to the volume of the desired article. During the following molding period, it is—on the one hand—no longer possible to effect any further compression of the molding material inasmuch as the mold is fully closed, but—on the other hand—the counterforce which is exerted upon the mold by the compressed molding material decreases as the result of the increasing heat of the material, the flow of the binder within the material, and—last not least—the decreasing pressure of the gases and vapors which are escaping from the mold. As this pressure decreases progressively within the molding, the specific surface pressure also decreases on the outer surface thereof. It has, however, been found that, in order to attain a closed and nonporous outer surface, it is necessary to mold the plastic cover sheets with a certain specific surface pressure in accordance with the type and composition of the plastic applied. Therefore, there is the danger, especially when working with small weighed-in quantities, that—because of the pressure drop within the molding—the specific surface pressure on the outer surface of the molding decreases to a point below the minimum pressure required for the plastic covering and that therefore defective outer surfaces may result. Furthermore, in accordance with their different composition, the filling or molding materials and the plastic covering materials also contain different kinds of volatile constituents, for example, their natural moisture content which is dependent upon their manufacture or storing, the reaction water which is formed during the setting process and becomes separated from the respective material, free formaldehyde, and other volatile constituents. Therefore, if the pressure decreases in the mold to a point below the vapor pressure of the volatile constituents which corresponds to the prevailing temperature, these constituents must change from the liquid phase to the vapor phase. It has now been found that open and porous outer surfaces are often only microscopically small, and that these small bubbles are caused by volatile constituents.

It has now been discovered quite unexpectedly that by proceeding according to the inventive method it is possible to prevent the formation of such vapor bubbles and the pores which are caused thereby in the surface of moldings by producing at the inside of the molding a gas pressure which exceeds the vapor pressure of the volatile constituents which latter pressure corresponds to the prevailing temperature, so that the volatile constituents cannot be converted into the vapor phase. The plastic covering which is to be applied according to the invention, which has a permeability to gases smaller than that of the filling or molding material, then acts similar to a relatively impermeable diaphragm as a barrier or blocking layer for the gas and is therefore pressed by the gas pressure against the walls of the mold, and at a specific surface pressure which exceeds the vapor pressure, so that no vapor bubbles can be formed on the outer surface of the plastic covering. The gas permeability of the molding mixture is dependent, for example, upon the type and granular size of the filler employed in the mixture, upon its content in binder, upon the extent of the compression in the mold, and other factors. The lower gas permeability of the plastic covering which may be required in each particular case may be determined in a very simple manner by tests. If the plastic covering to be applied should consist of a resin-impregnated paper web or similar plastic sheet materials, their gas permeability is usually lower than that of the molding material in the mold. After the plastic covering has once become set, any vapor bubbles which might then be formed can obviously no longer produce any pores. It therefore suffices if in the method according to the invention the gas pressure is produced at least during the period in which the material is setting in the area adjacent to the plastic covering, and it is not necessary to maintain the gas pressure also while the material is setting at the inside of the molded part. The determining factors for the height of the gas pressure which is produced according to the invention at the inside of the molded part is also not the compression ratio within the core of the molded part but the compression ratio on the outer surface thereof which is formed by the plastic covering which engages with the walls of the mold. If, therefore, for example, in moldings with thick walls, the gas pressure decreases from the core toward the outer surface, it is necessary to produce at the inside of the molding a gas pressure of such a height that a specific surface pressure will be formed at the outer surface of the molding which exceeds the vapor pressure of the volatile constituents.

In the known methods of production it is frequently necessary to discharge from the mold the hot vapors which are produced during the molding process, since the finished moldings when removed from the mold will burst. The molds have therefore been provided with openings through which the hot vapors can escape. These openings have also been used for the purpose of accelerating the setting process of the molding material by the additional supply of heat, namely, by changing periodically from a supply of hot gases to the inside of the mold to a discharge of the hot gases from the mold together with the vapors which are produced during the heating of the molding material and the vapors which are then liberated. The lower the compression of the molding material and therefore the greater the gas permeability of the molded part, the easier it will be to carry out such an alternating supply and discharge of gases. In order to improve the flushing effect, distributing members have also been employed which project into the molding material at the side of the molding, the surface of which is not coated with a plastic covering layer. When employing a mold of this kind, it is possible to carry out the method according to the present invention by closing the openings of the mold during the setting period at the area adjacent to the plastic covering. Naturally, this requires that otherwise the mold closes tightly and that by heating the molding material a sufficiently high gas pressure is produced at the inside of the mold, for example, by enclosed air, so that on the outer surface of the molding which is formed by the plastic covering a specific surface pressure will be produced which exceeds the vapor pressure of the volatile constituents. After the plastic covering has set, the openings of the mold may again be opened in order to discharge the vapors from the mold and to prevent a subsequent bursting of the molded part.

According to the present invention it is also possible to produce the internal gas pressure by adding gas and pressure-forming substances, that is, so-called expanding agents, to the molding material before it is filled into the mold. These substances which have the property of releasing gases and increasing in volume when heated by the molding material may, when applied in the proper amount, produce the necessary gas pressure at the inside of the mold. If the molding material as such when heated is incapable of producing a sufficient gas pressure, which is frequently the case especially because the molds do not close and seal sufficiently, the latter treatment may with considerable advantage also be combined with the manner of carrying out the invention as previously described. In that case, after the surface of the molding has set, the gas pressure which has been produced by the added substance may be released from the mold, and, if desired, the flushing operation as above described may be carried out in order to relieve the molded part of the vapors which are formed therein.

According to another feature of the invention, the internal gas pressure may also be produced by injecting compressed gases into the mold. This method has the advantage that the gas supply may be very accurately controlled so that, regardless of whether or not the mold seals tightly, a gas pressure of an exactly predetermined size may be produced at the inside of the molding and this may also be done at the desired time and for the desired length of time. For injecting the compressed gas, it is advisable to employ distributing nozzles which project into the molding, especially if the latter has a considerable thickness, an insufficient gas permeability, or both. The gas supplied is preferably heated so that no heat will be lost from the mold or the molding but, on the contrary, additional heat will thus be supplied to the inside of the molding to accelerate the setting process.

The manner of operation as above described may also be followed with considerable advantage if the method according to the invention is carried out in several stages rather than in a single stage, that is, if the molding is produced in several separate operations rather than in one continuous operation. It is then possible, for example, in a first operation, to premold the material under the application of heat to form a blank, for instance, of a chipboard, so that the binder in the molding material will set, whereupon in a second operation the plastic covering is molded upon this blank. It may then be advisable to mold channels in the first operation into the blank into which distributing nozzles may be inserted in the second operation for injecting the compressed gas into the inside of the molding. The gas then only needs to penetrate through a thinner layer of molding material which then also has a better gas permeability, and it is thus easier to produce the desired specific surface pressure on the outer surfaces of the molding.

A further feature of the invention provides for adding to the molding material such substances which either themselves or by means of their reaction products, which are produced by being heated, react with the molding material or the plastic of the covering layer or both and thereby start or accelerate the setting process of the respective materials. When injecting compressed gas, it is also possible in a similar manner to apply such gases or to add to the gas such components which start or accelerate the setting process of the molding material or the plastic of the covering layer or both.

The present invention may also be applied, for example, for the economical manufacture of hollow or solid table tops, doors, wall panels and man other articles in which hollow or solid bodies which consist of a porous material, for example, chipboard, are provided with a coating of plastic or plastic-impregnated material.

The above-mentioned as well as additional objects, features, and advantages of the present invention will become more clearly apparent from the following description of the new method and of several apparatus which are merely to be regarded as illustrative of some of the many different possibilities in which the inventive method may be carried out and which are illustrated diagrammatically in the accompanying drawings, in which—

Figure 5:
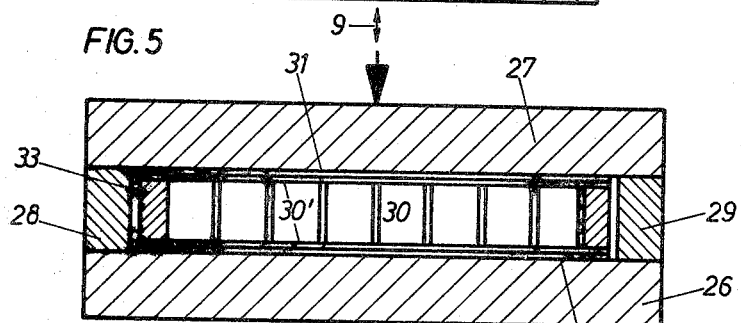
Figure 6:
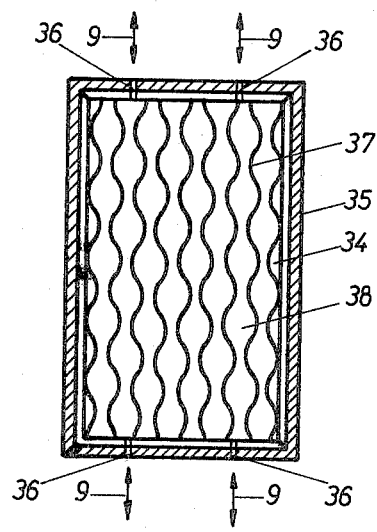

FIGURES 1 to 5 show vertical sections of different molds for carrying out the inventive method; while FIGURE 6 shows a horizontal section of a further mold according to the invention.

In the drawings, FIGURE 1 shows a mold consisting of a lower die 1 and an upper die 2 into which a porous material 3 is filled which while being compressed is to be coated with a sheet material 4, for example, of plastic or a plastic-impregnated material. The counterpressure which is furnished by the porous molding material 3 itself when the two dies 1 and 2 are in engagement with each other is insufficient to insure a proper bonding of the plastic covering 4 to the molding material 3 and a proper finish of this covering. The lower die 1 is therefore provided with a conduit 5 to which a distributor nozzle 6 is connected with projects into the mold chamber and thus into the porous molding material 3. A gaseous medium, for example, air or superheated steam, is then passed under pressure through the distributing channels 7 and 8 in nozzle 6 into the porous material 3. Although FIGURE 1 illustrates only one distributor nozzle in the flat horizontal side of the lower die 1, any desired number of such nozzles may be provided either in this side or in one or both ends of the mold chamber which are free of the coating 4 or at both points. The distributor nozzle or nozzles may also be of any desired shape which is most suitable for injecting the pressure medium into the molding material to produce the necessary internal pressure therein. As indicated by the double arrow 9, the pressure may also be varied or turned on and off periodically.

In the mold as illustrated in FIGURE 2, the lower die 10 and the upper die 11 are separated by end walls 12 and 13 which contain conduits 14 and 15 for supplying a gaseous pressure medium. Into the mold chamber a porous molding material 16 is inserted which is to be coated at both sides with a layer of sheet plastic or plastic-impregnated sheet material 17 and 18 while the molding material 16 is being compressed. The mold is made of a size so that lateral gaps remain between the body of a material 16 and the end walls 12 and 13 through which a gaseous pressure medium which is supplied through conduits 14 and 15 may penetrate into the uncoated ends of the body of porous material 16.

The mold as illustrated in FIGURE 3 is similar to that according to FIGURE 2, except that the conduits 14 and 15 in the end walls 12 and 13 terminates into distributor nozzles 19 and 20 similar to the nozzle 6 as shown in FIGURE 1.

FIGURE 4 shows a further mold which consists of a lower die plate 21 upon which an upper die 22 with a mold chamber 22' is placed into which a gaseous pressure medium is passed through a conduit 23 in the lower die plate 21. In this molding operation it is the purpose to bond two curved layers of sheet material to each other, the first layer 24 of which is placed in engagement with the arched inner surface of the upper die 22, while the second layer 25 is applied upon the surface of the first layer 24 and pressed against it at a predetermined pressure of the gaseous pressure medium within chamber 22'.

FIGURE 5 shows a mold consisting of a lower die plate 26, an upper die plate 27, and spacers 28 and 29 between them forming side walls. A hollow-frame door 30 is inserted into the mold for being covered at the upper and lower sides 30' by layers of plastic or plastic-impregnated sheet material 31 and 32. The gaseous pressure medium is passed into the mold through channels, not shown, which are provided, for example, in one or both end walls of the mold and terminate into the mold chamber and into the individual cells or compartments within door 30 so as to build up a sufficient internal pressure within the door to counteract the external pressure of dies 26 and 27 and thus to insure a proper bonding of the covering layers 31 and 32 to the flat upper and lower surfaces 30' of the door and to insure that layers 31 and 32 will be entirely flat and that these layers together with the door surfaces 30 will not bulge inwardly.

FIGURE 6 illustrates a mold 35 similar to that of FIGURE 5 with a similar hollow board or door 34 therein. The pressure medium is passed through channels 36 in the end walls of the mold into the hollow door compartments 38 which are separated by partitions 37. Unless these partitions are of a porous material they are preferably provided with apertures so that the pressure will be uniform within all compartments 38 of the door.

If the internal pressure is supplied by means of superheated steam or hot gases so as also to heat the contents of the mold, it may be advisable after the coating operation has been completed to switch the steam inlet of the mold to a vacuum line so as to evacuate the plastic-covered article within the mold and thereby to expel the remainder of the steam therefrom.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A molding method comprising the steps of inserting into a mold chamber a body comprising comminuted wood material having a porous structure and containing a thermosetting binder and having on at least a part of its outer surface at least one coating substantially consisting of plastic and having a gas permeability lower than that of the inside of said body, said coating containing volatile constituents capable of developing a gas pressure when said coating is heated, closing said mold chamber and thereby exerting a pressure upon the outer side of said coated body, heating said coated body within said mold, and exerting an internal gas pressure within said body so as to exert a uniform counterpressure within an area of said body adjacent to said coating, said counterpressure exceeding the vapor pressure of said volatile constituents and thus substantially preventing the development of said gas pressure, and thereby bonding said coating to said body.

2. A molding method comprising the steps of inserting into a mold chamber a body comprising comminuted wood filling material and a thermosetting binder and having on at least a part of its outer surface at least one coating substantially consisting of plastic and having a gas permeability lower than that of the inside of said body, said coating containing volatile constituents capable of developing a gas pressure when said coating is heated, closing said mold chamber and thereby applying a pressure upon the outer side of said coated body, injecting into said mold a hot gaseous medium under pressure so as to exert a uniform counterpressure upon said coated body within an area of said body adjacent to said coating, said counterpressure exceeding the vapor pressure of said volatile constituents and thus substantially preventing the development of said gas pressure, and thereby bonding said coating to said body.

3. A molding method comprising the steps of inserting into a mold chamber a body comprising comminuted wood material having a porous structure and containing a thermosetting binder and having on at least a part of its outer surface at least one coating substantially consisting of plastic and having a gas permeability lower than that of the inside of said body, said coating containing volalite constituents capable of developing a gas pressure when said coating is heated, closing said mold chamber and thereby exerting a pressure upon the outer side of said coated body, heating said coated body within said mold, and exerting an internal gas pressure within said body so as to exert a uniform counterpressure within an area of said body adjacent to said coating, said counterpressure exceeding the vapor pressure of said volatile constituents and thus substantially preventing the development of said gas pressure, and thereby bonding said coating to said body, and then evacuating said mold to reduce said internal gas pressure.

4. A molding method comprising the steps of inserting into a mold chamber comminuted wood filling material containing a thermosetting binder, at least one coating material covering said filling material substantially consisting of plastic and covering at least a part of the outside of said material and having a gas permeability lower than that of said material, said material and said coating also containing volatile constituents, closing said mold chamber and thereby applying a pressure upon the outer side of said coated material, heating said material to set binder and said coating, exerting an internal gas pressure within said material at least during the setting period of said binder and coating so as to apply said coating against the inner wall of said mold chamber with a specific surface pressure exceeding the vapor pressure of said volatile constituents and thus substantially preventing the development of said vapor pressure.

5. A molding method comprising the steps of inserting into a mold chamber comminuted wood filling material containing a thermosetting binder, and at least one coating substantially consisting of plastic and covering at least a part of the outside of said material and having a gas permeability lower than that of said material, said coating also containing volatile constituents, closing said mold chamber and thereby applying a pressure upon the outer side of said coated material, heating said material to set said binder and said coating and by said heating also developing within said material an internal gas pressure during the setting period of said binder so as to apply said coating against the inner wall of said mold chamber with a specific surface pressure exceeding the vapor pressure of said volatile constituents.

6. A molding method comprising the steps of inserting into a mold chamber comminuted wood filling material containing a thermosetting binder and substances capable when heated of chemically reacting at least with said binder to promote the setting of said binder and to develop gases, and at least one coating substantially consisting of plastic and covering at least a part of the outside of said material, said coating containing volatile constituents, closing said mold chamber and thereby applying a pressure upon the outer side of said covered material, heating said material to set said binder and coating and to cause a chemical reaction of said substances with said binder and to develop said gases to produce an internal gas pressure within said material at least during the setting period of said binder and coating so as to press and said coating uniformly against the inner wall of said mold chamber at a pressure exceeding the vapor pressure of said volatile constituents to bond said coating to said material.

7. A molding method comprising the steps of inserting into a mold chamber comminuted wood filling material containing a thermosetting binder, and at least one coating substantially consisting of plastic and covering at least a part of the outside of said material and having a gas permeability lower than that of said material, said coating containing volatile constituents, closing said mold and thereby applying a pressure upon the outer side of said coated material, heating said material to set said binder and said coating, and injecting into said material a heated gaseous medium under pressure containing means for promoting the setting of said binder and coating so as to produce an internal gas pressure within said material at least during the setting period of said binder and coating to press said coating uniformly against the inner wall of said mold chamber at a pressure exceeding the vapor pressure of said volatile constituents to bond said coating to said material.

References Cited by the Examiner
UNITED STATES PATENTS

| | | | |
|---|---|---|---|
| 1,439,197 | 12/1922 | Smith | 264—50 XR |
| 1,574,658 | 2/1926 | Johnston | 264—54 XR |
| 1,863,799 | 6/1932 | Loetscher | 264—135 |
| 2,041,377 | 5/1936 | Schwarz | 264—124 |
| 2,308,970 | 1/1943 | Carter | 18—53 |
| 2,335,649 | 11/1943 | Cooper | 264—50 |
| 2,376,653 | 5/1945 | Boyer | 264—54 XR |

(Other references on following page)

UNITED STATES PATENTS

| | | |
|---|---|---|
| 2,606,851 | 8/1952 | O'Mahony et al. __ 264—135 XR |
| 2,700,183 | 1/1955 | Beare _____ 18—53 |
| 2,802,766 | 8/1957 | Leverenz _____ 264—257 XR |
| 2,859,795 | 11/1958 | Greig _____ 264—136 XR |
| 2,977,639 | 4/1961 | Barkhuff et al. _____ 264—45 |
| 2,987,772 | 6/1961 | Beatty _____ 18—42 |
| 3,000,464 | 9/1961 | Watters _____ 264—321 XR |
| 3,035,310 | 5/1962 | Sokol et al. _____ 264—112 XR |
| 3,049,759 | 8/1962 | Eberhardt _____ 18—42 |
| 3,050,426 | 8/1962 | Stevens _____ 264—112 XR |
| 3,054,714 | 9/1962 | Johnston _____ 264—112 XR |
| 3,124,626 | 3/1964 | Graham et al. _____ 264—45 |

FOREIGN PATENTS

| | | |
|---|---|---|
| 461,806 | 2/1951 | Italy. |
| 1,069,103 | 7/1954 | France. |

OTHER REFERENCES

Modern Plastic, ". . . and why not nitrogen as a filler?", vol. 38, No. 9, May 1961, p. 164.

ALEXANDER H. BRODMERKEL, *Primary Examiner.*

MORRIS LIEBMAN, *Examiner.*

D. C. KOLASCH, P. E. ANDERSON,
*Assistant Examiners.*